Dec. 21, 1965 G. R. HERSHBERGER 3,225,150
VEHICLE LIGHTING, TIMING, AND WARNING SYSTEM
Original Filed Jan. 7, 1957 4 Sheets-Sheet 1
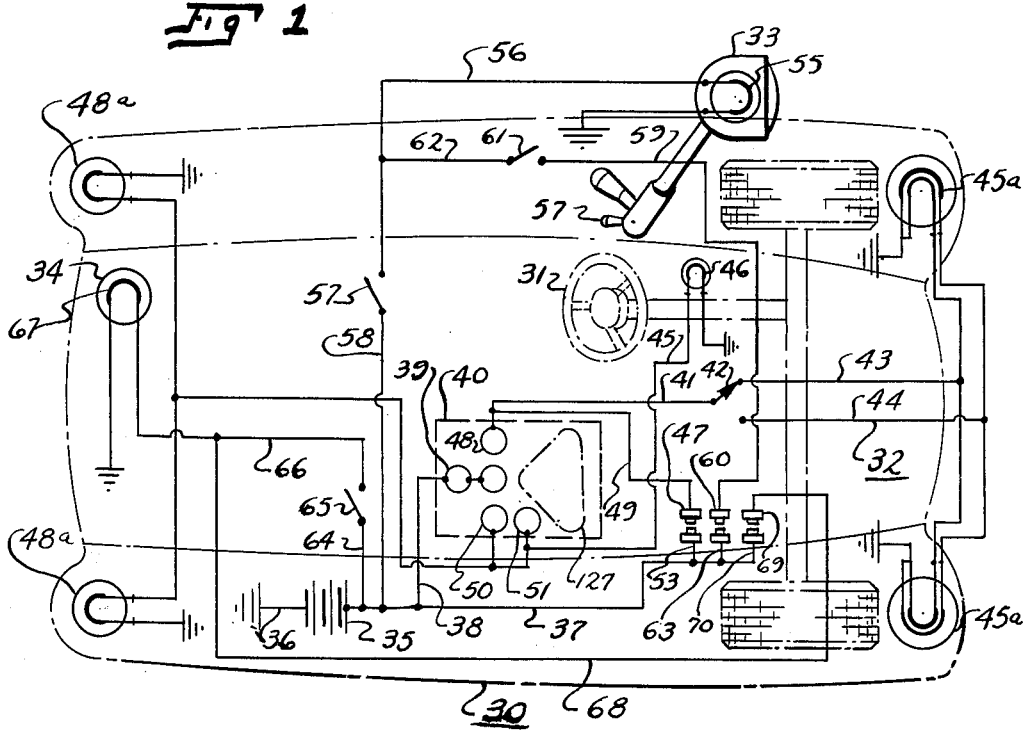
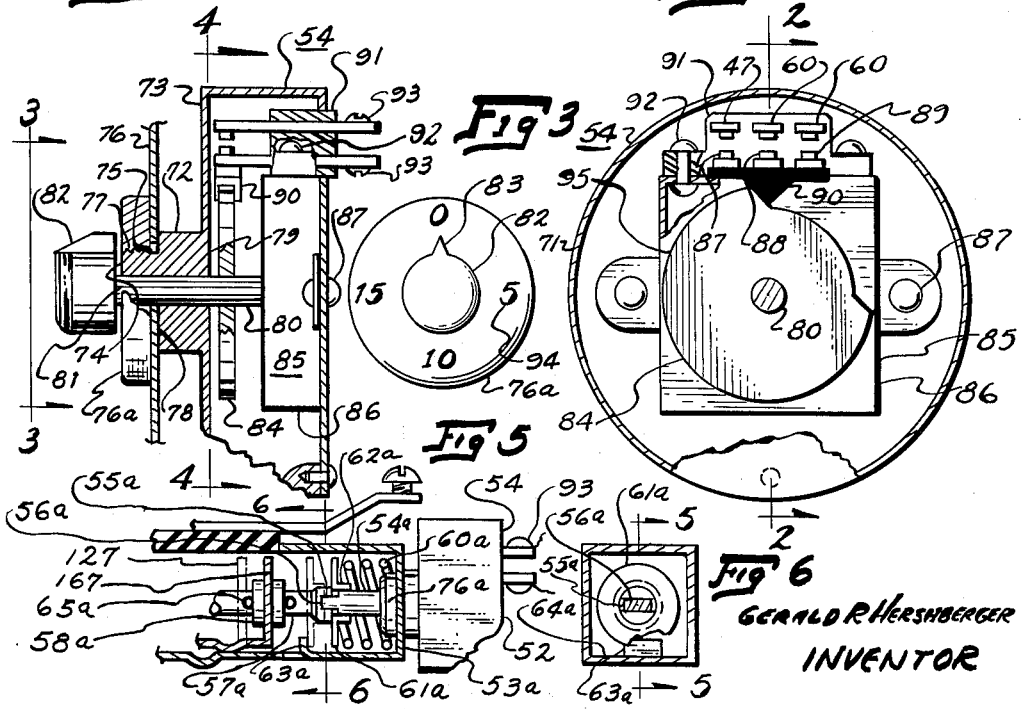
GERALD R. HERSHBERGER
INVENTOR

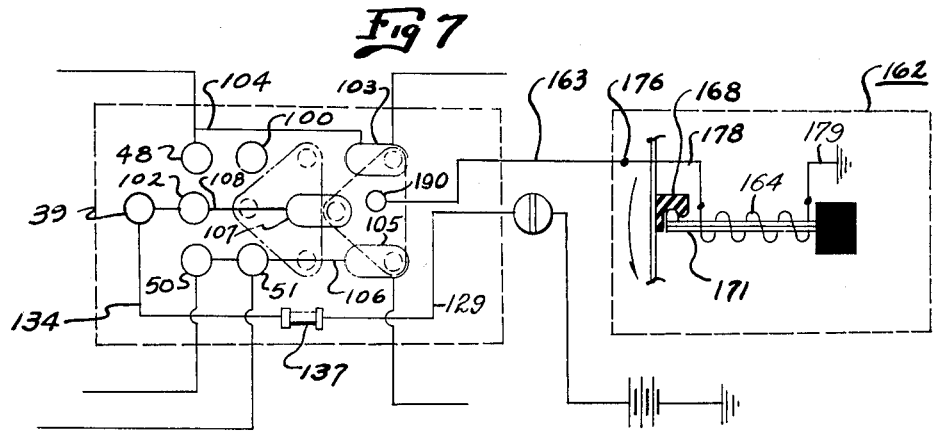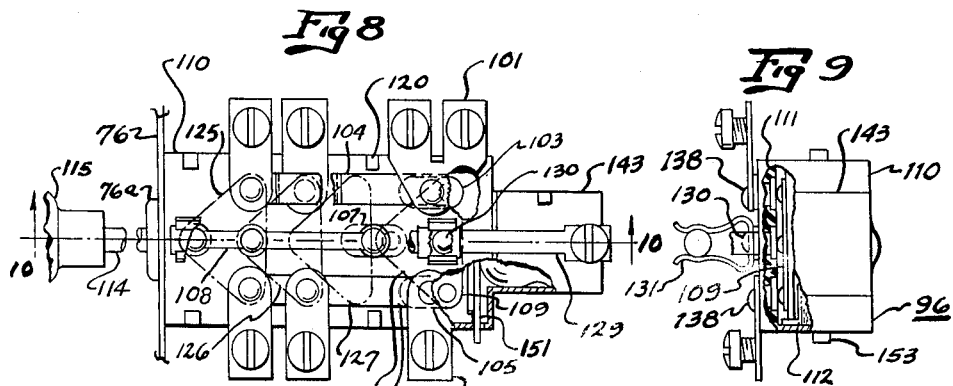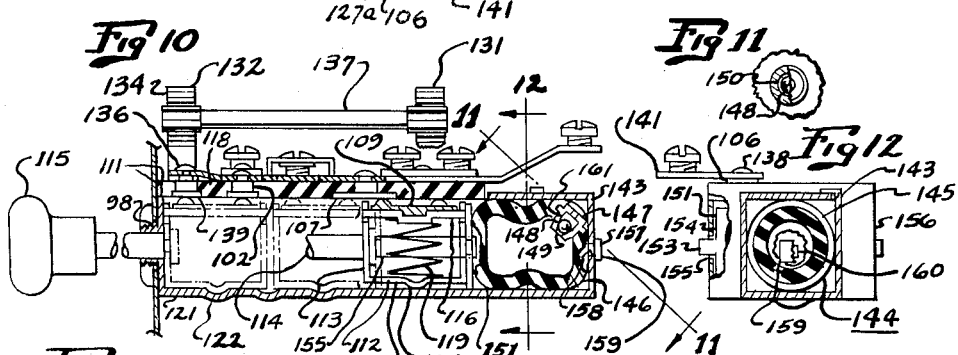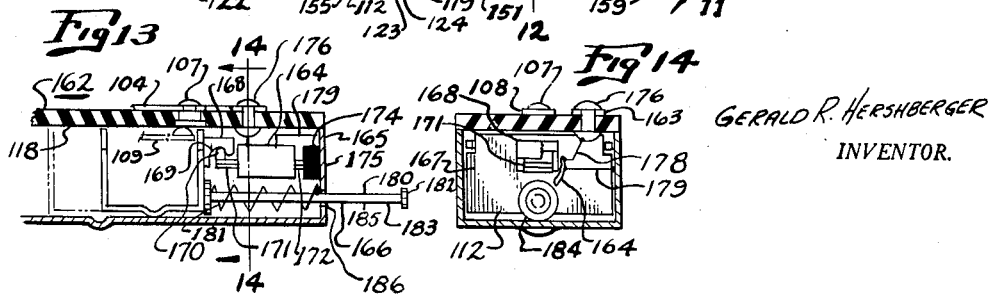

Dec. 21, 1965 G. R. HERSHBERGER 3,225,150
VEHICLE LIGHTING, TIMING, AND WARNING SYSTEM
Original Filed Jan. 7, 1957 4 Sheets-Sheet 3
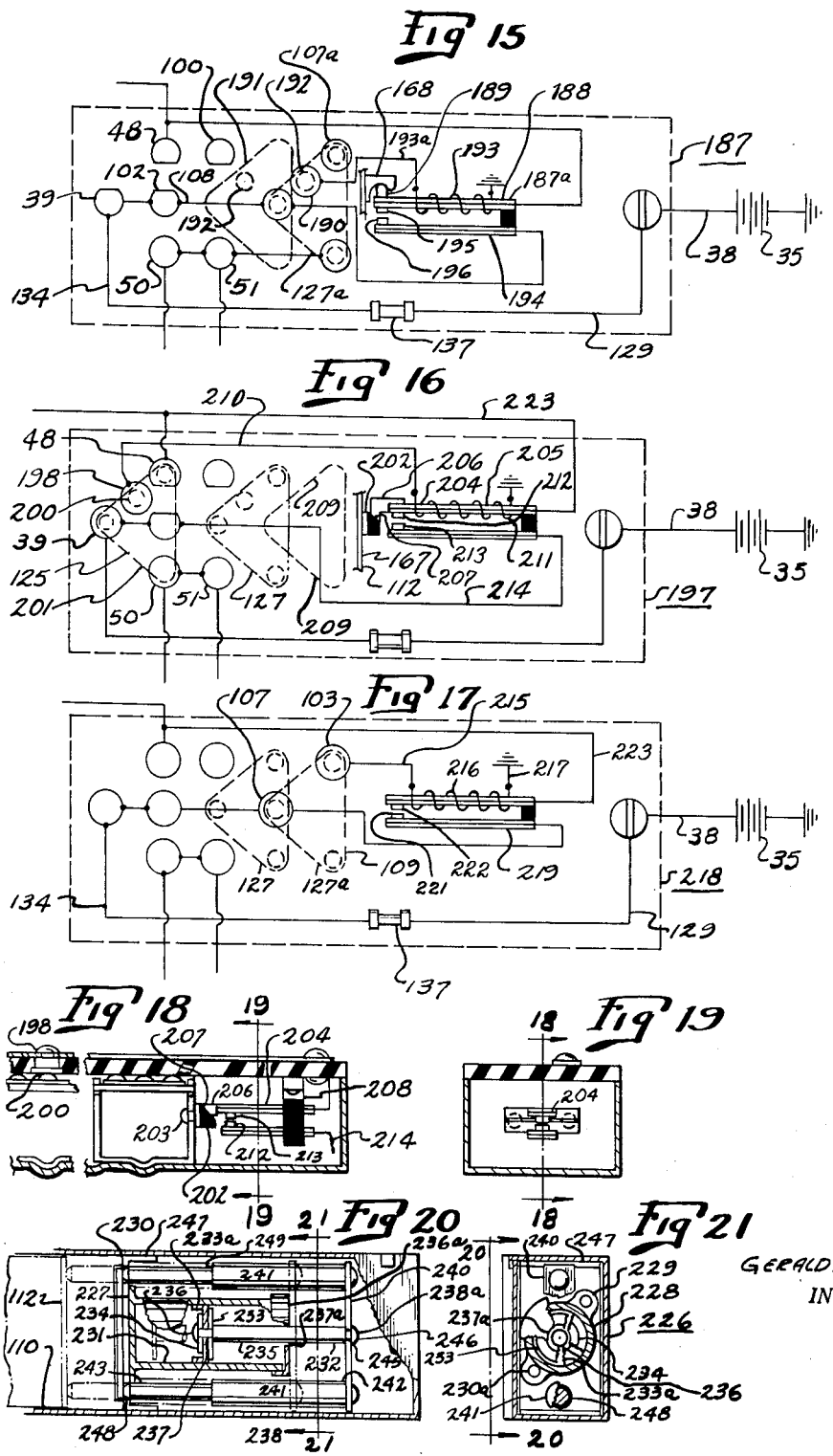
GERALD R. HERSHBERGER
INVENTOR.

Dec. 21, 1965   G. R. HERSHBERGER   3,225,150
VEHICLE LIGHTING, TIMING, AND WARNING SYSTEM
Original Filed Jan. 7, 1957   4 Sheets-Sheet 4
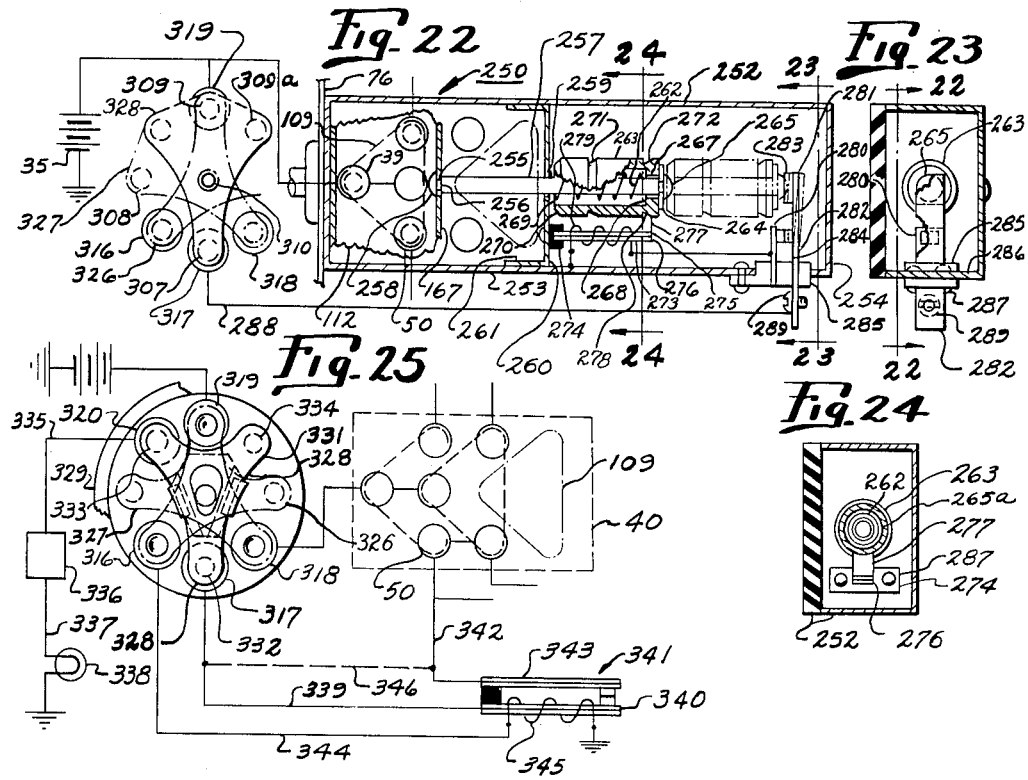
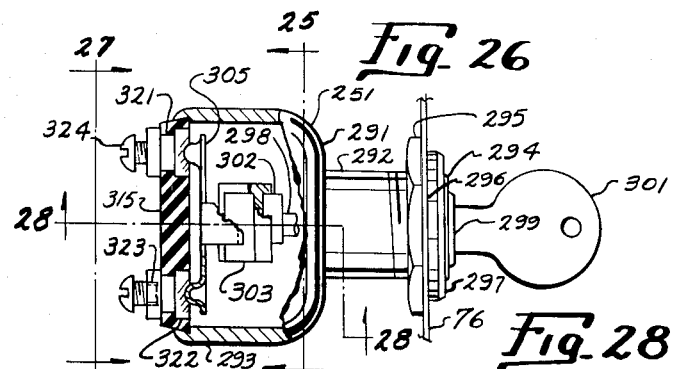
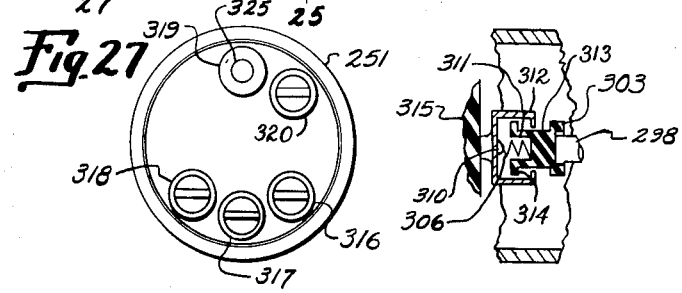
GERALD R. HERSHBERGER
INVENTOR.

United States Patent Office 3,225,150
Patented Dec. 21, 1965

3,225,150
VEHICLE LIGHTING, TIMING, AND
WARNING SYSTEM
Gerald R. Hershberger, Birmingham, Mich.
(285 E. Long Lake Road, Troy, Mich.)
Original application Jan. 7, 1957, Ser. No. 634,094.
Divided and this application Mar. 23, 1960, Ser. No. 30,699
13 Claims. (Cl. 200—33)

This invention relates to lighting systems, to switches, with particular attention to time controlled delayed action switches, warning systems, and more particularly to time switches, and lighting and warning systems for motor vehicles.

There are probably no frequent experiences in motor vehicle ownership more unpleasant than that of turning off the vehicle lights when returning home at night and then having to stumble up to the house in the dark without the benefit of light, or that of having started out driving with one's lights on in the morning when going to work, and then forgetting to turn them off when one arrives at work because in the meantime it has become daylight outside and one fails to notice that one has left his lights burning; and then after work, of hurrying to one's vehicle only to find that the battery is dead because the lights were left on. It is, therefore, an object of this invention to provide means for eliminating these factors.

This application is a division of my copending application Ser. No. 634,094, filed January 7, 1957.

It is an object of this invention to provide for automatic de-energization of the lighting system, or elements thereof, of a motor vehicle.

An object of this invention is to provide a time control system for use with a conventional vehicle lighting system that will automatically time the operation of the lighting system, or parts thereof.

Another object of this invention is to provide a time control mechanism having multiple contacts operable to selectively control the individual lighting circuits of the vehicle lighting system.

Another object of this invention is to provide combination lighting and time switches operable to control the vehicle lighting system.

Another object of this invention is to provide a light switch with a time clock mechanism combined therewith which is operable to delay de-energization of the vehicle lighting system.

Another object of the invention is to provide a light switch with a time delay mechanism which when preset holds the switch in delay position, then after a lapse of time releases the light switch from delay position, and then following a further lapse of time, de-energizes the vehicle lighting system.

Another object of this invention is to provide for increasing the normal time delay period of a thermal relay.

Another object of this invention is to provide a light switch with a time delay mechanism which automatically leaves the vehicle lights energized when the light switch is placed in normal off position from lights on position, and then following a lapse of time, automatically de-energizes the lights. Further in this connection, it is an object of this invention to provide for immediate de-energization of said lights if desired.

Another object of this invention is to provide a time switch with a time delay mechanism which may be releasably engaged, and the time delay element controlled by the the length of time that the time delay mechanism is engaged.

A further object of this invention is a provision in a switch for a time delay position, and a circuit open position, and a time delay mechanism which is operable to automatically return the switch to circuit open position when the switch is placed in the time delay position.

Another object of this invention is to provide a control system for a vehicle light which will automatically de-energize said light at the termination of a lapse of time following the de-energization of the ignition system of the vehicle.

Another object of this invention is to provide a warning system for vehicles whereby the operator is warned if he has left his light energized, and a provision for de-energizing the warning system following the lapse of an interval of time.

A further object of this invention is to provide an ignition switch with contacts in ignition off position for utilization in the control of the electrical circuits of a vehicle.

A further object of this invention is to provide a time control system for vehicles which will permit use of the vehicle and its steering components as a lighting mechanism which may be used to illuminate the darkness, or a path through the darkness, the time control system automatically de-energizing the lighting mechanism following the lapse of an interval of time so that it is not necessary for the operator to return to manually de-energize the lighting mechanism.

Other features and advantages of the invention will appear from the following description taken in connection with the drawings wherein:

FIGURE 1 is a plan view of a motor vehicle showing the various lighting circuits including the power controlling and driving light systems of a motor vehicle with my invention applied thereto.

FIGURE 2 is a cross section of a time switch mechanism taken along lines 2—2 of FIG. 4.

FIGURE 3 is a view taken of the front of the time switch mechanism showing the control knob and dial.

FIG. 4 is a sectional view taken along lines 4—4 of FIG. 2.

FIG. 5 is a sectional view of a combination light switch and time control mechanism taken along lines 5—5 of FIG. 6.

FIG. 6 is a sectional view taken along line 6—6 of FIG. 5.

FIG. 7 is a schematic diagram of the time delay switch illustrating the contactor arrangements and the thermal time delay means for introducing the factor of time into the electrical circuit.

FIG. 8 is a plan view of a functional time switch for use with a motor vehicle lighting system.

FIG. 9 is a rear view of the switch illustrated in FIG. 8.

FIG. 10 is an elevational section of the switch shown in FIG. 8 taken along lines 10—10 of FIG. 8.

FIG. 11 is a view along lines 11—11 of FIG. 10.

FIG. 12 is a rear sectional view taken substantially along lines 12—12 of FIG. 10.

FIG. 13 is an elevational section taken substantially along lines 10—10 of FIG. 8 and illustrates a modification of the time control mechanism.

FIG. 14 is a rear sectional view of the time switch shown in FIG. 13 taken substantially along lines 14—14 of FIG. 13.

FIG. 15 is a schematic diagram of a modification of a thermal delay mechanism applied to a time switch.

FIG. 16 is a schematic diagram of a further modification of the thermal delay means applied to the time switch.

FIG. 17 is a schematic diagram of a conventional thermal relay used with a modified vehicle light switch.

FIG. 18 is an elevational sectional view taken along lines 18—18 of FIG. 19 illustrating the structure of the time switch shown in FIG. 16.

FIG. 19 is a rear sectional view taken substantially along lines 19—19 of FIG. 18.

FIG. 20 is a sectional plan view taken substantially along lines 20—20 of FIG. 21 illustrating the structure of a modification of the air type time control mechanism.

FIG. 21 is a sectional rear view taken substantially along lines 21—21 of FIG. 20.

FIG. 22 is a composite view composed of a sectional plan view of the automatically de-energized light switch taken along lines 22—22 of FIG. 23, and schematic view of the ignition switch contactor and terminal post arrangement used with the light switch.

FIG. 23 is a vertical section taken substantially along lines 23—23 of FIG. 22.

FIG. 24 is a vertical section taken substantially along lines 24—24 of FIG. 22.

FIG. 25 is a composite view of the warning and time control system showing diagrammatically the contact elements of a conventional light switch and the structure of a modified ignition switch used with said light switch.

FIG. 26 is a vertical section taken along lines 26—26 of FIG. 27 illustrating an ignition switch.

FIG. 27 is a view of FIG. 26 taken along lines 27—27 of FIG. 26.

FIG. 28 is a horizontal section taken along lines 28—28 of FIG. 26.

Referring now to the drawings in detail, and first to FIG. 1 thereof, it will be seen that the invention as illustrated is applied to a conventional motor vehicle 30 having a steering mechanism 31, a conventional lighting system denoted generally at 32, a spot light 33, and a back-up light 34. The lighting system includes the battery 35 connected by lead 36 to ground and by lead 37 and 38 to terminal 39 of the driving light switch 40. From the switch 40 lead 41 is to the dimmer switch 42 and lead 43 is from the dimmer switch to the dim filament and lead 44 is to the bright filament of the headlights 45a. Lead 45 is to the dash lights 46.

As hereinafter described in detail, the invention employs a time delay switch 54 which has at least one set of normally open contacts. The invention as illustrated discloses three sets of normally open contacts. The contact set 47 is connected to the headlight terminal 48 of the switch 40 by lead 49. The lead 53 connects the contact 47 to lead 37, and thence to battery 35. It will thus be seen that if the light switch 40 is in off position 127 and the contacts 47 be closed by manual setting of the time switch shown in FIG. 2 the headlights 45a, will be energized for an interval of time determined by the setting to which the time switch 54 is adjusted. It is therefore evident that the purposes of the invention can be accomplished by one set of contacts, however, should it be desirable to control other driving lights such as the spot light 33 and the back-up light 34 more contacts must be provided as is further described in detail.

The lighting circuit of the spotlight 33 and back-up light 34 are as follows: The spotlight filament 55 is connected by lead 56 to manual switch 57 and thence by lead 58 to lead 37, and thence to battery 35.

An additional lead 59 is now connected from contact set 60 to switch 61, and a lead 62 from switch 61 to lead 59, and another lead 63 from contacts 60 to lead 37 and thence to battery 35. It will now be seen that if contacts 60 are closed in the manner previously described as to contacts 47, and the switch 61 closed, the spotlight filament 55 will be energized for a predetermined period of time. The conventional back-up light circuit is a lead 64 from battery 35 to back-up light switch 65, and a lead 66 from switch 65 to back-up light filament 67. A lead 68 is now connected from contact set 69 to lead 66, another lead 70 connects contact set 69 to battery 35. It will now be seen that closing of the contacts 69 in a manner previously described will energize the back-up light filament 67 in a manner described for the spotlight 33.

Referring now to FIGURES 2, 3, and 4 a time delay switch 54 is illustrated which is adapted for use in the circuits previously described. The elements of the time delay switch 54 are enclosed in a casing 71 comprising a cylindrical front portion 72 and an enlarged cylindrical rear portion 73. The forward end 74 of front portion 72 protrudes through an opening 75 in the instrument panel 76 of the vehicle 30, and is secured in this position by a nut 76a which engages the threads 77 on the forward end of front portion 72. The tightening of the nut 76a holds the shoulder 78 of cylindrical front portion 72 rigidly against the instrument 76. The front portion 72 has a cylindrical opening 79 in which the shaft 80 is journaled. The front end 81 of shaft 80 supports a control knob 82 which is provided with an indicator point 83. The enlarged rear portion 73 contains the holding means, member, or cam 84 which is integrally mounted on the shaft 80. The clock mechanism 85 of which the casing 86 is shown is mounted by rivets 87 to the casing 71. The shaft 80 which protrudes from the casing 86 is controlled by the clock mechanism 85. A follower 90, made from suitable insulating material engages the cam 84. The lower leafs 87, 88, and 89 of contact sets 47, 60, and 69 are molded securely to the follower 90 so that the contacts will move integrally with the motion of the follower 90. Contact sets 47, 60, and 69 are of the spring leaf type, and the cam 84 is so positioned as to allow said contact sets to be normally open. Said contact sets are molded securely in a block 91 of suitable insulating material. The block 91 being secured in position by rivets 92 to the casing 54. The contact sets 47, 60, and 69 are provided with screws 93 exterior of the casing 54 by which the electrical leads may be secured to said contact sets. The nut 76a is provided with calibrations 94 indicating the minutes to which the time delay switch 54 may be adjusted.

In operation, light switch 40 is opened and the knob 82 is turned clockwise until the indicator point 83 is opposite the calibration indicating the number of minutes of delayed energization of the lights required. Rotation of the knob 82 rotates cam 84 and brings the raised cam surface 95 of cam 84 in contact with cam follower 90 closing the contact sets 47, 60, and 69 suspending temporarily said time delay switch 54 in a potentially energized state and energizing the light circuits previously described. Subsequent action of the time clock mechanism 85 returns the cam 84 to its former position automatically following the lapse of an interval of time, and said contact sets are automatically opened de-energizing the electrical circuits previously described.

Referring now to FIGURES 7, 8, 9, 10, 11, and 12 a time delay switch 96 is illustrated which may be used with a vehicle lighting system. The wiring diagram illustrated in FIG. 7 is similar to that shown for lighting switch 40, FIG. 1, having in common, a headlight terminal 48, a tail light terminal 50, dash light terminal 51, a parking light terminal 100, and a battery terminal 39 for the head light circuit, and a battery terminal 102 connected in series to terminal 39 for energizing the parking light circuit which is of conventional design and is not illustrated. A contactor 109 of conventional triangular shape is utilized. In addition, the switch 96 is provided with a time delay position having elongated terminals of which terminal 103 is connected to the headlight terminal 48 by lead or connector 104, and the terminal 105 by lead 106 to the dash light terminal 51 and the tail light terminal 50. The elongated battery post 107 is connected in series by a lead or connector 108 to terminal post 102. It will thus be seen that when the contactor 109 is moved into time delay position 97 contacting terminals 107 103, and 105 the headlights 45a, tail lights 48a, and dash light 46 will be energized.

The structure of the time delay switch 96 is based on a conventional lighting switch used on motor vehicles, and the conventional elements of the switch will be described briefly to clarify the operation and construction of the new elements. The combination switch and time control elements of the time delay switch 96 illustrated in FIGURES 8, 9, 10, 11, and 12 are enclosed within a substantially rectangular shaped housing or casing 110 which is preferably of metal and of which the upper side 111 is open. Within the casing 110 a slidable carriage 112 is fitted. The carriage 112 is in the shape of a channel. The open ends of the carriage 112 are fitted to the walls of the casing and permit the carriage to be moved fore and aft in said casing. One end of a control shaft 114 is riveted to the front face 113 of the carriage, the other end of said shaft extends through a hole 98 in said casing and on said other end is secured a control knob 115. Within the upper portion of the carriage 112 is fitted an insulating plate 116 which in turn supports the contactor 109; the contactor 109 being held against the terminal post insulating block 118 by compression spring 119, said spring exerting pressure against the bottom of the channel portion of said carriage, and against the plate 116. The terminal insulating block 118 forms the top of the casing 110 and is held in place by bent over tabs 120. The bottom side 121 of casing 110 has indentations 122 and the lower face 123 of the carriage 112 has detents 124 which engage said indentations and hold the carriage 112 releasably in driving lights on position 125, park position 126, or lights off position 127 by virtue of the pressure exerted by spring 119 against carriage 112 and the insulating plate 116. The terminal post insulating block 118 supports the terminal posts 39, 48, 50, and 100, which are of conventional design, and the elongated terminal posts 103, 105, and 107. Said elongated posts are mounted in time delay position 127 on the block 118 adjacent lights off position 127. The elongated portion 128 of the terminal posts 103, 105, and 107 face the contactor 109, and when the contactor 109 is in contact with said terminal posts, the circuits previously described in connection with switch 54 will be energized. The battery connector 129 is riveted to insulating block 118 by rivet 130, said rivet also securing one end 131 of a fuse holder 132 to block 118, the other end 134 of said fuse holder and one end of the connector 108 are secured to the insulating block 118 by means of a rivet head 136 formed from the upper portion of battery terminal post 39. A fuse 137 placed in the fuse holder 132 completes the circuit. The reduced end of elongated terminal post 107 is formed into a rivet head to secure the end of connector 108 opposite said battery terminal post 39 to the insulating block 118. Post 103 is secured to connector 135 and said insulating block 118 in like manner as for post 107. The connector 104 bridges the parking light terminal post 100 and is secured at one end thereof to the elongated terminal post 103, the plate 101, and to the block 118 in like manner as for terminal post 107. The plate 101 is provided with double ends to accommodate additional accessories if desired. Terminal plate 141 and one end thereof of connector 106 is secured to the insulating block 118 by a rivet head 138 formed from the external portion of the elongated terminal post 105. The rear portion 143 of the casing 110 houses the time control mechanism 144. The time control mechanism 144 consists of an air escapement means consisting of a hollow cylinder 145 of resilient material such as rubber. The rear end 146 of the cylinder 145 is provided with a holding member or valve 147, said valve being installed in said cylinder on an incline so that the ball 148 is held by gravity in the smaller orifice 149 of the valve seat 150 unless forced therefrom by air pressure. A retaining plate 151 is provided between the forward end 152 of cylinder 145 and the carriage 112. Ears 153 are provided on the edges 154 of the plate 151 and said ears engage slots 155 in the sides 156 of the casing 110.

The force exerted by said cylinder holds said plate in engagement with said carriage 112. The cylinder 145 is prevented from turning in the casing 110 by a rectangular projection 157 molded from the material of the cylinder 145. The projection 157 has a neck portion 158 and a head portion 159. The head portion 159 is pressed through a hole 160 in the casing 110 which is smaller than the head 159, and the elasticity of the excess material holds the cylinder 145 in place.

In operation, the control knob 115 is pressed towards the rear of the casing 110; the carriage 112 engages the plate 151, continued pressure forces the plate 151 and the cylinder 145 rearward compressing said cylinder. As the cylinder 145 is compressed air is forced from said cylinder 145 through valve 147, said valve permitting air to escape because air pressure will force the ball 148 upward into the larger orifice 161 of the valve seat 150. The carriage 112 is moved until the contactor 109 is in time delay position 127a engaging the terminal posts 107, 103, and 105 energizing the headlights 45a, and to other lights as previously explained. When the carriage 112 is pressed to the end of the slots 155 and released, the ball 148 falls back into the smaller orifice 149 of the valve seat 150 restricting the return of air to the cylinder 145 and suspending said time control mechanism 144 in a potentially energized state. The resilient quality of the material of the cylinder tends to return the cylinder 145 to its original shape and is permitted to do so by the gradual leakage of air through the valve 147, said cylinder forcing the carriage 112 into normal off position 127 following the lapse of an interval of time. The elongation of terminal posts 103, 105, and 107 will therefore permit adjustment of the time interval by adjustment of the carriage rearward a lesser or greater amount. The time control system will operate with fuse of the conventional terminal posts but the degree of adjustment of the time interval would not be as flexible.

Reference to FIGURES 5 and 6 will disclose a modification of the invention wherein a conventional light switch of the type described for switch 96 is used in combination with a time delay mechanism similar to time delay switch 54. The aforesaid combination or time switch 52 is comprised of the time delay switch 54 mounted on the rear wall of the rear portion 143 of casing 110 in a manner described for mounting of said switch on the instrument panel 76. The time switch is mounted with the shaft 54a directed towards the carriage 112. The shaft 54a is similar to shaft 80 except that the end of shaft 54a which extends exterior of the casing 71 is provided with a tongue 55a which is of suitable proportions to engage a slot 56a in the end of control shaft 57a. The control shaft 57a controls the movement of carriage 112 in a manner described for control shaft 80, however, the shaft 57a is secured rotatably to the rear wall 167 of carriage 112 by collars 58a spaced on each side of wall 167 and held thereto by pins 65a. A compression spring 60a is placed over shaft 54a and held in place by a washer 61a which is provided with an extruded cylindrical portion 62a which is journaled on shaft 54a. The said washer is held in restricted movement by flange 63a which is upturned from the bottom wall 64a of casing 110.

In operation, the carriage 112 is moved manually towards the rear wall 53a of casing 110 until the end of the shaft 57a engages the washer 61a, continued movement of the said shaft compresses the spring 60a allowing the said washer to slide on shaft 59a permitting the tongue 55a to engage the slot 56a; rotation of the shaft in this position will operate the time switch 54 in a manner previously described for said switch 54 energizing previously described circuits. When the said shaft is released the said spring and washer will return the said carriage to normal off position 127, disengaging said tongue and slot.

Referring now to the wiring diagram shown in FIG 7, and FIGURES 13 and 14, a thermally controlled time switch 162 is illustrated. The arrangement of the terminal posts 103, 105, and 107 is the same as that for time delay switch 96 except that said terminals are not required to be elongated. One end of a connector 163 is connected to terminal post 103, the other end to holding member or heating element 164 of switch 96. During the period the contactor 109 remains engaged with said terminal posts the heating element 164 will be heated; in the normal off position 127 of the contactor 109 the heating element 164 will remain unheated.

The construction of the thermally controlled time switch 162 is the same as for the switch 96 except for the differences which are hereinafter further described and illustrated. The rear portion 165 of the switch 162 compares to the rear portion of switch 96 and contains the time delay mechanism 166. The rear wall 167 of carriage 112 supports a catch 168 constructed from a hard surfaced insulation material; said catch is secured to the carriage 112 by cementing or other suitable means. The catch 168 is provided with a rounded groove 169 which is of suitable proportion to releasably engage a projection 170 mounted on the free end 172 of the time control member 171. The time control member 171 is composed of strips of bimetal supported as a cantilever beam from insulation block 174, with said insulation block mounted on the rear wall 175 of casing 110. The connector 163 is riveted to insulation block 118 by rivet 176. A lead 178 is connected to holding member or heating element 164 from connector 163, and a lead 179 grounds said heating element on casing 110. A carriage return mechanism is contained in the rear portion of the casing 112 and consists of a push rod 185, a compression return spring 181, and a retaining nut 182. The push rod 185 consists of a cylindrical metal rod threaded at one end 183 to take the nut 182, and provided with a thin flat head 184 on the opposite end, said flat head being larger in diameter than the diameter of spring 181. The spring 181 is placed over said rod engaging said flat head, then the threaded end of the rod 180 is inserted through a hole 186 in the rear wall 175 of the casing 112. The spring 181 is compressed in the process and the nut 182 is turned on the threaded end of the rod 180. The nut 182 is larger than the hole 186 so that the push rod 180 is secured in place by the pressure of the spring 181 exerted against the head 184 of the rod 180 and the rear wall 175 of the casing 110.

In operation, the carriage 112 is forced towards the rear wall 175 manually against the pressure of the spring 181 until the catch 168 engages the projection 170, and since the leaf spring pressure of the time control member 171 is made greater than the pressure exerted by the spring 181, the carriage 112 is releasably locked or suspended in delay position 127a. In said delay position the contactor 109 contacts the terminals 103, 105, and 107 as previously described for switch 96, and the lighting circuits previously mentioned are energized. In addition, the circuit to the heating element 164 is closed through terminal 107, contactor 109, terminal 103, connector 163, lead 178, heating element 164 and lead 179 to ground. The heat radiated by the heating element 164 heats the time control member 171, said member, by virtue of said heat, moves slowly away from catch 168 until the projection 170 disengages the groove 169, following a lapse of time, and the carriage return mechanism returns the carriage 112 to normal off position 127 by the pressure of spring 181. The nut 182 acts as a stop to assure that said spring will return said carriage to said off position 127.

A combination thermal delay relay and release system 187 is illustrated in FIGURE 15. System 187 is the same as the thermally controlled time switch 162 except for the modifications shown in FIGURE 15. The thermal relay 187a is secured to the carriage 112 in the same manner as for the time control member 171. The upper contact carrying member 188 of the thermal relay 187a is provided with a projection on 189 which engages the catch 168 in a manner previously described for switch 162. The added terminal post 190 is secured to insulation block 118 in a manner previously described for terminal post 107. The contactor 191 is the same as contactor 109 except that an additional nib 192 is added which will contact terminal post 190 when said contactor is moved into delay position 127a. Terminal posts 48, 100, 39, and 102 are flattened on one side to clear contactor nib 192 as said contactor is moved through the various circuit controlling positions.

In operation, the carriage 112 is moved into suspended or delay position 127a in a manner described for switch 162, and the vehicle lights are energized as the contactor closes the before described circuits. In addition, the contactor 191 closes the circuit to holding member or heating element 193 through lead 193a thereby heating the upper contact carrying member 188. Said upper contact carrying member is comprised of bimetal strip material and will move, upon heating, slowly towards the lower contact carrying member 194. The spacing between the contacts 195 and 196 of said contact carrying members is calculated so that the contacts will close before the projection 189 is released from catch 168. The contacts 195 and 196 will then remain closed for an interval of time measured by the cooling time required to return said contact carrying members to normal off position and thereby de-energizing the vehicle lights. It will thus be seen that system 187 provides double the delay period provided by the conventional thermal relay, to wit: The time required to heat the contact carrying member plus the time required to cool said contact carrying member.

Referring now to FIGURES 16, 18 and 19, an automatic time delay switch 197 is illustrated. The portions of switch 197 not illustrated are the same as described for switch 162. In addition, a terminal post 198 is provided in driving lights on position 125 which will contact the nib 200 in contactor 201 when said contactor is in position 125. The rear wall 167 of carriage 112 supports a beveled block 202 which is secured to said carriage by rivets 203 or other suitable means. The upper contact carrying member 204 of thermal relay 205 is provided with a beveled projection 206 which engages the beveled edge 207 of block 202 under circumstances to be described. The thermal relay 205 is secured to insulating block 118 by rivets 208 or other suitable means. A detent arrangement previously described for switch 162 is provided in position 209 to hold the carriage 112 in said position against the block 202.

In operating the switch 197, the carriage 112 is placed in position 125. In said position 125 the contactor 201 contacts terminal post 198 and a circuit is closed from battery terminal post 39 through contactor 201, through connector or lead 210 to heating element 211, said heating element being grounded to casing 110. The heating element 211 being energized by the electric current from said battery, will heat the upper contact carrying member 204 and the contacts 212 and 213 will close. The heating element remains energized during the period that the contactor 201 is in position 125, but when the contactor 201 is moved to off position 127, or position 126 by movement of carriage 112, the circuit to the heating element 211 is broken; however, the circuit from the battery 35 through lead 214 to the contacts 212 and 213 and thence through lead 223 to the terminal 48 will remain automatically energized until the heating element 211 and the upper contact carrying member cool permitting the contacts 212 and 213 to open and de-energize the light circuits before mentioned. It will therefore be seen that the timing of the lights is automatic with the movement of the carriage 112 into off position 127. A further provision is made for immediate de-energization of the lights if desired: The carriage 112 is placed in secondary off position 209; the beveled block 202 thereby engages the beveled projection 206 on the thermal relay 205 and the contacts 212 and 213 are forced open de-energizing the lights immediately.

Referring to FIGURE 17 a modification of the thermally controlled switch 162 is illustrated. The thermal delay system 218 is utilized in connection with the carriage return mechanism illustrated in FIGURES 13 and 14. Battery terminal post 107 and terminal post 103 are provided in delay position 127a. When the carriage 112 is moved into said delay position the contactor 109 engages said terminals. A lead or connector 215 is connected to the terminal post 103 and to the heater element 216, and lead 217 connects the holding member or heater element 216 to ground. The advantage of this modification is that the thermal relay element 219 may be of conventional design and mounted in any convenient location on said vehicle.

In operation, the carriage 112 is moved into delay position 127a, the contactor 109 contacts terminal posts 107 and 103 and the circuit is closed from the battery to terminal post 107, through said contactor to terminal post 103, through lead 215 to heater element 216 and lead 217 to ground. The contactor 109 is resiliently held manually in position 127a against the pressure of spring 181 until the heater element 216 has suspended closed the contact carrying members 221 and 222 of the conventional thermal relay element 219 energizing the headlights 45a and tail lights 48a in a manner described for system 197. After energization of the lights the carriage 112 is released and spring 181 returns said carriage to off position 127; however, said lights are not de-energized until the heater element 216 cools permitting the said contact members to open following the lapse of an interval of time. The lapse of time may be regulated by holding said contactor engaged for a longer or shorter period of time.

Referring to FIGURES 20 and 21, a modified vehicle time delay switch is illustrated. The details of the time delay switch 226 not shown in FIGURES 20 and 21 are the same as for switch 96. A suport or bracket 230 provided with flanges 247 is secured by said flanges within casing 110 intermediate the carriage 112 and rear portion of said casing. The bottom 227 of tubular shaped casing 228 is provided with ears 229 by which said casing is fastened to the support 230 by rivets 230a or other suitable fastening means. The inside of casing 228 is formed into a cylinder 231 which accommodates a piston and rod assembly 232. The piston and rod assembly 232 is comprised of a large washer 233 of correct size to fit slidably into cylinder 231, a seal or leather holding member 233a placed adjacent the washer 232, and another washer 234 of smaller diameter placed adjacent the seal 233a. The said washer 232, said seal 233a, and said washer 234 are riveted integrally to the end of piston rod 235 by means of rivet head 236 formed from the end of necked down portion 237 of piston rod 235 in the order previously mentioned. The piston assembly 232 is inserted into the cylinder 231, the spring 238 is placed over the piston rod 235, and the cover 236a which is provided with a guide hole 237a is placed over the piston rod 235 and welded securely to the casing 228. The rear portion 238a of piston rod 235 now protrudes through the cover 236 of casing 228. An actuator or push rod assembly 239 consisting of a yoke 240 and two pins 241 is now prepared for assembly to the piston rod 235. The pins 241 are provided with a large diameter cylindrical portion 242 and a small diameter cylindrical portion 243. The large portion 242 of the pins 241 is secured to the opposite ends of yoke 240 by riveting or welding or other suitable means, so that said pins are extended in the same direction from said yoke. A hole in the center of yoke is drilled to fit a necked down portion 245 of the piston rod 235, the yoke resting on the shoulder 237 formed by the necked down portion 245, and held securely thereto by a rivet head 246 formed from the exess metal of necked down portion 245. The push rod assembly 239 is attached to the piston rod 235 so that the pins 241 extend towards the base of the casing 228. Two guide holes 248 are provided in the support 230, said holes spaced to allow entry of the smaller diameter portion 243 of pins 241. In inactive position the pins 241 extend through the support 230 until the shoulders 249 formed by the smaller and larger diameter 243 and 244 engages the support 230 and are held resiliently against said support by the spring 238, said spring exerting force against the piston assembly 232 and therefore against the push rod assembly 239.

To operate the time switch 226, the carriage 112 is placed in delay position 127a; in doing so the carriage 112 forces the push rod assembly 239 and piston assembly 232 rearward into suspended or time delay position. The carriage 112 is then released and the spring tends to return the push rod assembly and piston assembly and the carriage 112 to off position 127. As before described for switch 96, the contactor 109 remains on the elongated terminals 103, 105 and 107 for a period of time; in this instance the period of time is measured by the gradual escape of air from cylinder 231 past seal 233. As the air escapes the cylinder 231 the force of the spring 238 disengages the contactor 109 from said terminals and the carriage 112 and contactor 109 are returned to off position 127 thereby de-energizing the vehicle lights in the manner previously described for switch 96. It is evident from the foregoing description of this modification of the invention that this mechanism provides a simple, inexpensive, and positive method for timing the type of light switch illustrated. Another advantage of this modification is that by varying the amount of travel of the carriage 112 and the contactor 109 on the elongated terminals 103, 105, and 107, the period of time delay may be varied.

Referring to FIGURES 22, 23, 24, 26, 27 and 28, a modification of the invention, a vehicle light control system 250 is illustrated which utilizes a specially constructed ignition switch 251, and a specially constructed light switch 252. The elements of light switch 251 not illustrated are the same as the elements of switch 96 previously described. The casing 253 of said switch 252, however, has an extended compartment 254 which houses part of the light control system 250. The compartment 254 is formed by a partition 260 which has flanges 261 which are formed to fit and are welded to the sides of casing 253. The rear wall 167 of carriage 112 is provided with an aperture 255 which receives the reduced portion 256 of rod 257, said reduced portion then is peened over the wall 167 to form a rivet head 258 which secures the rod to the carriage 112. The opposite end of the rod 257 extends into the compartment 254 through aperture 259 located centrally in partition 260. A compression spring 262 is placed over the end of rod 257 which extends into the compartment 254, and over both the spring 262 and the rod 257 is located the latch casing 263. The latch casing 263 is held in place on said rod against the tension of said spring by means of a washer 264 located over the other necked down portion of said rod which is peened over to form rivet head 265 which secures said washer to the other end of said rod. The latch casing 263 is a cylindrical metal casing having an inner cylinder wall 265a to accommodate the spring 262, and having a hole 267 at the closed end 268 of the casing 263 to journal the rod 257. The open portion 269 of casing 263 is provided with a beveled edge 270, and the center portion of said casing is provided with two cylindrical tapered grooves; a forward groove 271 adjacent the open end of the casing 263, and a rear groove 272 adjacent the closed end 268 of said casing. A thermally operated catch 273 is secured to the partition 260 by means of insulating block 274. The bimetallic strips 275 of said thermally operated catch are supported parallel to the longitudinal axis of said casing as a cantilever beam. To the free end 276 of strips 275 is secured a projection 277, said projection has a cam face 278 which is operable to releasably engage the tapered grooves 272 and 273 when casing 263 is moved into operative position. A heating element 279 is thermally coupled to the bimetal strip 275, and is electrically connected to the short contact member 280 of the thermal control switch 281. The thermal control switch 281 is comprised of a short contact member 280 and a longer contact member 282. Said longer contact member is provided with an insulation strip 283 which is cemented to the inside face 284 of said longer contact member. The insulation strip 283 is engaged by the rivet head 265 on the rod 257 when the carriage 112 is moved to normal off position 127 resulting in opening the switch 281. The contact members 280 and 282 are mounted in an insulating block 285, said insulating block being secured normal to the side 286 of compartment 254 by means of rivets 287. A lead 288 is connected to the exposed end of contact member 282 by means of screw 289, the other end of said lead 288 is connected to terminal post 317 of ignition switch 251.

Referring to FIGURES 26, 27, and 28, the ignition switch 251 illustrated comprises part of the vehicle light control system 250 and is a modification of a conventional ignition switch disclosed in U.S. Patent #2,170,154. The combined lock and switch elements of the ignition switch 251 are enclosed within a housing 291 comprising a cylindrical front portion 292 and an enlarged cylindrical rear portion 293. The forward end 294 of front portion 292 is threaded to receive nut 295. The nut 295 is rotated on the end of front portion 292 until a number of threads protrude beyond said nut. The front portion 292 is then placed into an aperture 296 in the instrument panel 76a of the vehicle. A knurled nut 297 is then tightened on the threaded end of front portion 292 securing the housing 291 in place. A lock structure, preferably of the type including a rotary cylinder 298, is encased within the front portion 292 of the housing 291. The front end 299 of lock cylinder 298 is provided with a suitable opening 300 for receiving a key 301 by means of which the lock structure is actuated, and the moving element of the switch structure is moved into its various circuit controlling positions. The lock cylinder may be of any well known construction and is preferably of the type disclosed in said U.S. Patent 2,170,154 in which a plurality of spring pressed plungers extending transversely of the cylinder, engage with a longitudinal groove in the housing 291 in order to retain the device in locked position, unlocking thereof being accomplished by the insertion of the key 301. The cylinder 298 is retained within the housing 291 by the engagement of an arcuate, spring pressed retainer plate with an annular shoulder on the housing 291. The free end of the lock cylinder 298 is provided with an irregular positioning lug 302 which is rotatable with the key 301. The said lug 302 engages a similarly shaped recess in the insulated retaining block 303. Mounted within an annular recess 311, between the block 303 and the contactor 305 is a coiled compression spring 306 which is operable to hold the contactor 305 resiliently against the terminal block 315 when the parts are assembled in the housing 291.

The contactor 305 is substantially triangular in shape and is provided with four radially spaced contact elements 307, 308, 309 and 309a, pressed outwardly from one side thereof, and an outwardly pressed central boss 310 on the opposite side for engagement within one end of the coiled spring 306 on the opposite side for engagement within one end of the coiled spring 306, the opposite end of which is seated within the recess 311 in the adjacent face of the block 303. The contactor 305 is provided with a pair of oppositely arranged arms 312 which extend into diametrically arranged grooves 313 in the block 313, with the free ends thereof bent inwardly for engagement with abutments 314 to retain the contactor 305 in position with respect to the block 303 before the parts are assembled in the housing 291 and to provide for rotating the contactor with the block 303. The movable contact elements 307, 308, 309, and 309a cooperate with a plurality of stationary contact elements supported by the terminal block 315. While the number and arrangement of the stationary contact elements may be varied as may be required by the circuits to be controlled, the structure shown herein is adapted for use in controlling ignition, accessories, and vehicle light circuits.

The terminal block 315 is preferable molded from a phenol resin composition. The block 315 is disk shaped with the edge of the disk beveled. The terminal posts 316, 317, 318, 319, and 320 have reduced diameters 321 which are pressed into corresponding holes in the face of said disk. The reduced portion of said terminal are then peened over into the recess 322 provided in the terminal block and thereby rigidly secured. The said terminal posts are provided with internal threads 323 to receive screws 324. The contactor 305, spring 306, and the retaining block 303 are placed on the lock cylinder lug 302, the terminal block with said terminal posts attached is placed in the housing with the larger diameter of the disk engaging the shoulder of the housing 291; the flange adjacent the shoulder is then staked over the disk securing said disk integrally to said housing. The peened over portion of said terminal posts are provided with detents 325 which hold the contactor 305 releasably in the several stations. The contact elements 307 and 309a contact the terminals 316 and 319 respectively in conventional manner when the lock cylinder is rotated into ignition on position 326, and terminals 318 and 319 respectively when rotated into accessory position 327; however, in ignition off position 328 the time delay terminal 317 contacts the contact element 307, and the battery terminal post 319 contacts contact element 309 closing the circuit to the heating element 279. The time delay terminal 317 is preferably located radially between the accessory terminal 318 and the battery terminal 319. The contact element 309 is located radially between the contact element 309a and 308.

To operate the system 250, the ignition key is rotated to ignition on position 326, and the motor is started. The light switch carriage 112 is moved by means of knob 115 to either park position 126, or headlights on position 125 energizing the vehicle lights. The movement of the carriage 112 actuates the rod and washer secured thereto causing the washer 264 to engage the latch cylinder 263 and move it with the said carriage until the forward groove 271 or the rear groove 272 which corresponds to headlights on position 125 engages the cam face 278 on projection 277 of the thermally operated catch 273 holding said latch cylinder casing releasably in position against the pressure of compression spring 261. The lights may now be manually energized or de-energized without interference from the latch cylinder. However, with the lights energized and the ignition key turned to ignition off position the vehicle lights will remain energized, and following the lapse of an interval of time the lights will be automatically de-energized as follows: When the ignition key is turned to ignition off position 328 a circuit is closed from the battery 35 to the terminal 319 through contactor 305 to the terminal 317, through lead 288 to the closed thermally operated catch 273, and thence to the heating element 279. Following the lapse of an interval of time the increase in temperature of said heating element heats the bimetallic strip causing the projection to move downward moving the cam face 278 away from the latch casing 263 and out of the groove 272 releasing said latch cylinder which, because of the pressure exerted by spring 261 against the partition 260 and latch cylinder casing 263, engages the waser 264 on the rod 257 and moves said rod and carriage 112 to lights off position 127, and the rivet head 265 of the rod 257 engages the insulated strip 283 on the switch 281 opening said switch and breaking the circuit to the heating element, and permitting said catch to return to normal position by cooling of the heating element. With the said latch cylinder in engagement with said catch and the lights manually de-energized by moving the carriage 112 to off position 127, the said rivet head 265 engages the said insulated strip opening said switch 281 and breaking the circuit to said heating element with said ignition switch in off position 328. The breaking of the circuit to said heating element is desirable to de-energize the entire system and prevent unnecessary drain on the battery 35. Should the latch casing 263 remain engaged with the catch 273 and the lights manually de-energized by moving the carriage 112 to off position 127, the carriage 112 will be held in position 127 by means of the detent and indent previously described and the thermal control switch 281 held in open position by the pressure of the rivet head 265 against the insulated strip 283 de-energizing the heating element 279.

Referring to FIGURES 25, 26, 27, and 28 a modification of the invention is illustrated wherein a warning system is provided which will warn the operator of the motor vehicle that the driving lights of the vehicle are energized when the ignition system is de-energized. A provision is also made for automatically de-energizing the warning system following a period of operation of said system, provided that the lights are not manually de-energized beforehand. The terminal block 329 is similar to the terminal block 315 except that the terminal block 329 is provided with an additional terminal post 320 which is located radially adjacent the battery terminal post 319. The contactor 331 is essentially triangular in shape and is provided with three contact elements, 332, 333, and 334. In ignition off position 328 of the contactor the contact element 332 engages the terminal post 317, and the contact element 333 engages the terminal post 320. In the event the key 301 is rotated clockwise said contact elements disengage said terminals and engage the battery post 319 and the ignition post 316 energizing the ignition circuit, and breaking the warning system circuit; counterclockwise rotation of the said key and said contactor engages contact elements 332 with battery terminal post 319 and accessory terminal post 318 in conventional manner. The contactor 331 is held in the ignition switch housing 291 in the same manner as for contactor 305. One end of a lead 335 is connected to terminal post 320 and the other end to flasher unit 336 which may be of conventional design and the same flasher that is used for controlling the directional signal lights of the vehicle. Another lead 337 is connected from the flasher unit 336 to a signal 338 such as a lamp or light bulb, which may be the same light or lights that are used in the aforesaid directional control system. Said lights are properly grounded. A lead 339 is now connected from the terminal post 317 to the lower contact carrying member 340 of a thermal relay switch 341. Another lead 342, one end of which is connected to the upper contact carrying member 343 of switch 341 and the other end of which is connected to one of the driving light terminals 50 completes the circuit to the flasher unit 336 and the warning light 338. To complete the warning system a lead 344 is connected on one end to the ignition terminal 316 and the other end to the holding member or heating element 345 which engages the lower contact carrying member 340 of the switch 341. The switch 341 may be supported on any suitable part of the motor vehicle. The warning system will operate less the switch 341 however, without the said switch the warning system will operate indefinitely or until the lights are de-energized manually, or until the key 301 is rotated counterclockwise to accessory position 327 or clockwise to ignition on position 328 breaking the circuit to the flasher unit 336 and the lamp 338. In the event the switch 341 is not used a lead 346 is connected directly from the terminal post 317 to terminal 50 on the light switch 40.

In operation, the ignition key is rotated clockwise rotating the contactor 331 into ignition on position 328 and the said contact elements engage the said battery terminal post and the said ignition terminal post energizing the ignition circuit and the motor may be started. The light switch contactor 109 is moved manually to headlights on position 125, or park position 126 energizing the vehicle lights. The circuit from the battery terminal post 319 through the contactor 109 to terminal 316 through lead 344 to heating element 345 is now closed energizing said heating element closing and temporarily suspending the normally open contacts carried by the contact members of switch 341. At a later time, when the ignition switch is rotated to said ignition off position opening the ignition circuit and de-energizing the motor, the circuit from the light switch terminal 50 through lead 342, to switch 341, to terminal 317 on the ignition switch, through the contactor 331, to terminal 319 on the ignition switch, to lead 335, to flasher unit 336 to lead 337 to lamp 338 is closed energizing said flasher unit and the signal lamp 338. The rotation of the contactor 331 to said ignition off position breaks the circuit to the heating element 345, and said heating element cools. The closed contacts open at the termination of the lapse of an interval of time de-energizing the circuit to the said flasher unit and the said lamp. The delay of time occasioned by the cooling of the said heating element gives the operator the opportunity to realize that the vehicle lights are energized and to manually de-energize said lights. In the event the warning is not heeded the automatic opening of said contacts breaks the circuit to the said flasher unit and the lamp, de-energizing them and preventing unnecessary drain on the battery 35, and wear on the flasher unit. In a system not utilizing the delay switch 341 the circuit is closed to the flasher unit and the lamp until the key 301 is rotated to accessory position 327 or to ignition on position 328 or until the light switch 40 is manually placed in lights off position 127.

While certain forms and arrangements of the elements employed in the invention are disclosed herein, it will be understood that these are illustrative and that various changes may be made therein without departing from the invention as defined by the appended claims.

I claim:

1. In a time switch, housing means, electrically conductive contactor means for movement into circuit making position reciprocally carried by said housing means, electrically insulated contact carriage means assembled with said contactor means for movement as a unit with said contactor means, force applying means interposed between said contactor means and said carriage means for urging said contactor means and said carriage means in opposite direction against said housing means, time switch knob extending from said housing to actuate and in direct connection with said carriage means, a timing means initiated into a potentially energized state by the shifting of said carriage means by said knob in one direction, a holding member to suspend said timing means temporarily in said potentially energized state, and means actuated by the shifting of said carriage means in the opposite direction to release said holding member in predetermined time controlled relation to the movement of said carriage means.

2. The invention as set forth in claim 1 wherein said timing means is further defined as fluid activated.

3. The invention as set forth in claim 1 wherein said timing means is further defined as a time clock mechanism.

4. In a time switch, housing means provided with opposing sides, contactor member reciprocally supported on one of said sides, a terminal block of di-electric material supported on the other of said sides and having a plurality of stationary contact elements mounted thereon in cooperative relation to said contactor member, force applying means urging said contactor member into engagement with said block, means in said housing for retaining said terminal block and said contactor member in assembled relationship, a time switch knob extending from said housing to reciprocally slide said contactor member along said block, a circuit controlling member actuated by the simultaneous shifting of said contactor and said switch knob in one direction, timing means initiating said circuit controlling member into a potentially energized state by the movement of said time switch knob in one direction, a holding member to suspend said circuit controller member temporarily in said potentially energized state, and means actuated by the shifting of said time switch knob in the opposite direction to release said holding member in predetermined time controlled relation to the movement of said switch knob.

5. The invention as set forth in claim 4 wherein said force applying means is further defined as resilient means.

6. In a time switch, circuit means provided with a first circuit closing member, a second circuit closing member and a rest position, electrically conductive contactor member adapted for linear movement from said rest position into engagement with said first circuit closing member and thence upon further pressure, from said first circuit closing member into engagement with said second circuit closing member with the direction of movement from said first circuit member to said second circuit member being along the same line and in the same direction as the initial movement from said rest position into engagement with said first circuit closing member, timing means initiated into a potentially energized state by movement of said contactor member from said rest position, a holding member to suspend said timing means temporarily in said potentially energized state, and means actuated by the shifting of said contactor member in the opposite direction to release said holding member in predetermined time controlled relation to the movement of said contactor member into said rest position.

7. The invention as set forth in claim 6 wherein said timing means is further defined as thermal translating means.

8. The invention as set forth in claim 6 wherein said timing means is further defined as fluid escapment means.

9. The invention as set forth in claim 6 wherein said timing means is further defined as time clock means.

10. The invention as set forth in claim 6 including force applying means for releasably holding said contactor means into alternative engagement with said first circuit closing member and said second circuit closing member.

11. In a time switch, a housing, a plurality of separate circuit making and breaking means electrically insulated from each other supported on said housing, a dielectric carriage member for moving said circuit making and breaking means as a unit simultaneously into circuit controlling position, time switch knob extending from said housing shiftable to actuate said dielectric carriage member, timing means initiated into a potentially energized state by the movement of said time switch knob in one direction, a holding member to suspend said timing means temporarily in said potentially energized state, and means actuated by the shifting of said switch knob in the opposite direction to release said holding member in predetermined time controlled manner to open said circuit making and breaking means in response to the movement of said switch knob.

12. The invention as set forth in claim 11 including contactor means associated with said manually operated means.

13. In a time switch, in combination, a stationary dielectric terminal block, a plurality of spaced terminal members supported in said terminal block with adjacent ends thereof terminating in the same plane parallel to one face of said terminal block to provide stationary contact elements, a movable electrically conductive contactor member having one face thereof positioned parallel to the plane of said contact elements, means urging the face of said contactor member into engagement with said contact elements, manually operated means to slidably reciprocate said contactor member in the plane of said contact elements to selectively engage respective contact elements, and time delay means initiated into a potentially energized state by the movement of said manually operated means in one direction, a holding member to suspend said time delay means temporarily in said potentially energized state, and means actuated by the shifting of said manually operated means in the opposite direction to release said holding member in predetermined time controlled relation to the movement of said manually operated means.

References Cited by the Examiner

UNITED STATES PATENTS

| | | | |
|---|---|---|---|
| 2,185,524 | 1/1940 | Sachs | 200—116 |
| 2,309,039 | 1/1943 | Bluemle et al. | 200—16 |
| 2,324,730 | 7/1943 | Sharpe | 200—34 |
| 2,641,661 | 6/1953 | Puerner et al. | 200—33 |
| 2,824,932 | 2/1958 | Ellenberger | 200—116 |

FOREIGN PATENTS 593,677    3/1934    Germany.

KATHLEEN H. CLAFFY, *Primary Examiner.*

MAX L. LEVY, WALTER STOLWEIN, BERNARD A. GILHEANY, ROBERT K. SCHAEFER, *Examiners.*